Sept. 20, 1955     A. J. CHEESEBREW     2,718,087
FISH HOOK SHIELD
Filed Oct. 5, 1953

Arthur J. Cheesebrew
INVENTOR.

BY *Clarence A. O'Brien*
*and Harvey B. Jacobson*
Attorneys

2,718,087
FISH HOOK SHIELD

Arthur J. Cheesebrew, Columbus, Ohio

Application October 5, 1953, Serial No. 384,263

3 Claims. (Cl. 43—43.15)

The present invention relates to an improved shield or guard which serves to temporarily encase a fish hook when the latter is not in use.

The invention has more specific reference to a shield which has been especially designed to facilitate the handling of a trot-line during the time the latter is stretched out for use or, alternatively, when it is reeled or otherwise hauled in after the fishing period is over. It may be explained in this connection that the idea of a protective fishing hook guard on and in association with a trot line is not, of course, broadly new. Reference may be had, for example, to a patent granted to one Gail Wineinger, Patent No. 2,582,090, on January 8, 1952. Admittedly, it is old in the art to provide the combination of a trot-line, a leader attached at one end to the trot-line and carrying a fish hook on its other end and providing a handily accessible hook-like shield or guard on the trot-line which serves to encase the fishing hook when the trot-line is taken in for storage or other purposes.

An object of the instant invention is to structurally, functionally and otherwise improve on the Wineinger patent and any other analogous prior art adaptations which have been evolved and produced by others to attain similar safeguards for those who are called upon to set out and take in trot lines having a multiplicity of fish hooks attached thereto by leaders or otherwise.

In carrying out the principles of the instant invention a hollow sheath serves to temporarily encase the fish hook, said sheath being constructed to accommodate not only the hook but to allow the leader to have sliding and detachable association therewith.

Another object of the invention has to do with a specially designed sheath having the characteristics stated and wherein said sheath is provided with a suspension hook which is releasably engageable with the trot-line, is pivoted at one end on one side of the sheath and is foldable to an out-of-the-way position wherever necessary or desired.

A further object of the invention has to do with the stated sheath which is further characterized by a fixedly attached spring clip, said clip being mounted on one side of the sheath and being adapted to be releasably attached to the trot-line so that the fish hook may be drawn up tightly and safely encased in the sheath and thus to effectively safeguard the activities of the fisherman who sets out or takes in the trot-line.

In the drawings, wherein like numerals are employed to designate like parts throughout the views.

Figure 1:
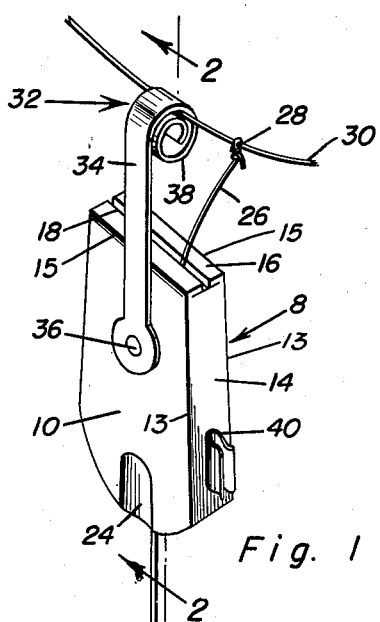
Figure 1 is a perspective view of a fish hook protective shield constructed in accordance with the principles of the present invention.
Figure 4:
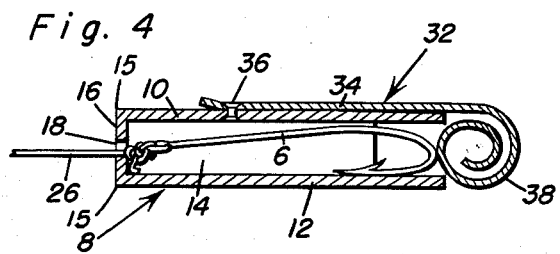
Figure 4 is a section on the line 4—4 of Figure 3 looking in the direction of the arrows.

The sheath may be of a suitable size to encase and protectively house the fish hook 6, said sheath being denoted, as a unit, by the numeral 8. The sheath is of general rectangular form and provides a receiver or pocket for the hook when the hook is not in use as shown in Figures 3 and 4. In its preferred embodiment the sheath comprises a pair of spaced parallel flat walls 10 and 12 joined along longitudinal edges 13, 13 by what may be called a marginal wall 14 and similarly joined along transverse edges 15, 15 by way of a top wall 16. The top wall has a line slot therein as at 18. One longitudinal side of the sheath is thus open, as denoted at 20, and one end is open as at 22. Adjacent the open end 22 and on one side wall is a depression 24 which serves a purpose to be hereinafter described. The slotted end wall 16 serves to accommodate the leader 26 which is attached at 28 to the trot-line 30. The means for attaching the sheath to the trot-line comprises a suspension hook 32 which specifically comprises an arm 34 pivoted at one end as at 36 to the intermediate portion of the side wall 10. The arm is of springy material and the free end portion thereof is coiled upon itself to provide a line attaching hook 38. The hook is releasably engaged with the trot-line in the manner shown that is when the leader is suspended and the hook 6 is in use as shown in Figure 1. On the closed side wall 14 there is a fixed retaining clip 40 and this is so arranged that it may be attached to the trot-line in the manner shown in Figure 3. It follows that when the fish hook is extended for use as shown in Figure 1, the sheath is attached to the trot-line and the leader extends through the slot in the sheath with the hook suspended below the open bottom of the sheath all as brought out in the drawings. When the trot-line is to be hauled in or otherwise stored away the hook 32 is detached from the trot-line and the sheath is brought alongside the trot-line in somewhat parallel relationship and the clip 40 is engaged with the trot-line. This clips the sheath to the trot-line in a position at right angles to that shown in Figures 1 and 2. It renders the leader more or less taut and keeps the hook safeguarded within the confines of the walls of the sheath. The arm portion is folded to an out-of-the-way position and is snapped into the keeper seat 24, whereby said hook takes the out-of-the-way position shown in Figure 3.

Figure 2:
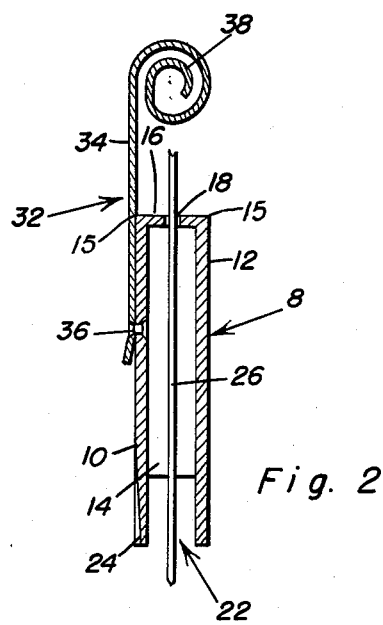
Figure 2 is a section on the line 2—2 of Figure 1 looking in the direction of the arrows.
Figure 3:
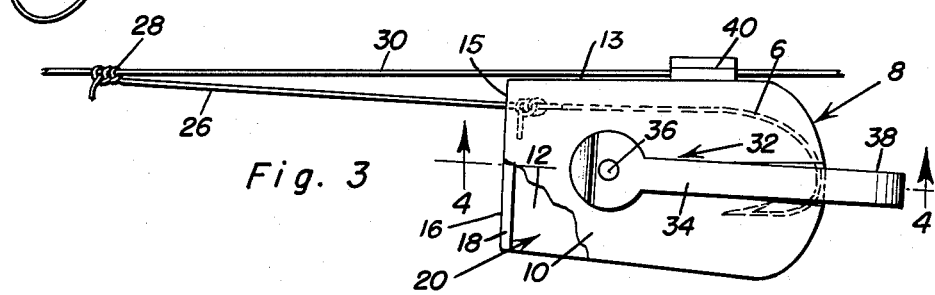
Figure 3 is a side elevation with a portion broken away and showing the manner in which the shield is clipped on the trot-line in a so-called out-of-the-way position.

It is believed that the two positions of the sheath and the alternate position of the fish hook and relationship of parts to the trot-line will be clear considering the progressive uses shown first in Figures 1 and 2 and then in Figures 3 and 4.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In combination, a trot-line, a leader attached at one end to the trot-line, a fishhook secured to the other end of the leader, a hollow sheath, said leader being adapted to extend slidingly through the sheath, said fishhook being adapted to be drawn wholly into the sheath and safeguarded thereby, and an arm pivoted at one end on said sheath and having a hook at its other end swingable in a path outwardly of the marginal edges of the sheath and releasably and slidably engageable with the trot-line, said arm being foldable to an out-of-the-way position relative to said sheath when not in use and said sheath having a keeper seat into which the arm is snapped when said hook is not in use.

2. In combination, a trot-line, a leader attached at one end to the trot-line, a fishhook secured to the other end of the leader, a hollow sheath, said leader being adapted to extend slidingly through the sheath, said fishhook being adapted to be drawn wholly into the sheath and safeguarded thereby, an arm pivoted at one end on said sheath and having a hook at its other end swingable in a path outwardly of the marginal edges of the sheath and releasably and slidably engageable with the trot-line, said arm being foldable to an out-of-the-way position relative to said sheath when not in use and said sheath having a keeper seat into which the arm is snapped when said hook is not in use, and a clip fixed to one marginal side of the sheath and adapted to detachably join the sheath with the trot-line when the fishhook is housed protectively in said sheath.

3. As a new article of manufacture, a hollow sheath embodying a pair of spaced parallel walls having marginal longitudinal and transverse edges, an imperforate marginal wall interconnecting corresponding longitudinal edges of said parallel walls, a slotted wall interconnecting corresponding transverse edges of said parallel walls, the remaining marginal edges being unattached and spaced apart whereby said sheath is completely open along one longitudinal edge and along an adjacent transverse edge, a resilient attaching clip secured to said imperforate wall and adapted to be detachably connected with a trot-line, one exterior surface of one of the spaced parallel walls of the sheath having a depression providing a keeper seat, and an arm having a portion superimposed against the exterior of said one wall and having one end pivotally joined to a central portion of said one wall, the opposite end of said arm projecting beyond the marginal edges of the sheath and terminating in a hook which is detachably connectible with said trot-line, and said arm being engageable with said keeper seat.

References Cited in the file of this patent

UNITED STATES PATENTS

| | | |
|---|---|---|
| 724,427 | Bonsall | Apr. 7, 1903 |
| 847,298 | Sullivan | Mar. 12, 1907 |
| 1,954,127 | Harsted | Apr. 10, 1934 |
| 2,582,090 | Wineinger | Jan. 8, 1952 |
| 2,584,430 | Dayton | Feb. 5, 1952 |
| 2,592,438 | Lawrenz | Apr. 8, 1952 |
| 2,622,729 | Uttz | Dec. 23, 1952 |